US010682789B2

(12) United States Patent
Konstantinou et al.

(10) Patent No.: US 10,682,789 B2
(45) Date of Patent: Jun. 16, 2020

(54) EPOXY MOLD MAKING AND MICROMILLING FOR MICROFLUIDICS

(71) Applicant: Bio-Rad Laboratories, Inc., Hercules, CA (US)

(72) Inventors: Daniel Konstantinou, Toronto (CA); Alwin Wan, Toronto (CA); Tal Rosenzweig, Toronto (CA); Amir Sadri, Toronto (CA); Nenad Kircanski, Toronto (CA); Edmond Young, Toronto (CA)

(73) Assignee: Bio-Rad Laboratories, Inc., Hercules, CA (US)

( * ) Notice: Subject to any disclaimer, the term of this patent is extended or adjusted under 35 U.S.C. 154(b) by 568 days.

(21) Appl. No.: 15/503,360

(22) PCT Filed: Aug. 28, 2015

(86) PCT No.: PCT/US2015/047393
§ 371 (c)(1),
(2) Date: Feb. 10, 2017

(87) PCT Pub. No.: WO2016/033434
PCT Pub. Date: Mar. 3, 2016

(65) Prior Publication Data
US 2017/0225363 A1 Aug. 10, 2017

Related U.S. Application Data

(60) Provisional application No. 62/044,131, filed on Aug. 29, 2014.

(51) Int. Cl.
*B29C 33/40* (2006.01)
*B29C 33/42* (2006.01)
(Continued)

(52) U.S. Cl.
CPC .... *B29C 33/3878* (2013.01); *B01L 3/502707* (2013.01); *B29C 33/40* (2013.01);
(Continued)

(58) Field of Classification Search
CPC ............ B29K 2863/00; B29K 2033/12; B01L 2300/0087; B01L 3/00; B29C 33/3878;
(Continued)

(56) References Cited

U.S. PATENT DOCUMENTS

2002/0176804 A1* 11/2002 Strand .................. B01J 19/0093
422/400
2003/0180711 A1 9/2003 Turner et al.
(Continued)

FOREIGN PATENT DOCUMENTS

WO 2007/085043 A1 8/2007

OTHER PUBLICATIONS

Young et. al., Rapid prototyping of arrayed microfluidic systems in Polystyrene for cell based arrays, Analytical Chemistry, 2011, 83, 1408-1417 (Year: 2011).*
(Continued)

*Primary Examiner* — Alison L Hindenlang
*Assistant Examiner* — Debjani Roy
(74) *Attorney, Agent, or Firm* — Kilpatrick Townsend and Stockton LLP

(57) ABSTRACT

A method for efficiently manufacturing and fabricating microfluidic chips, where a base mold is formed to have positive-relief features used to cast an intermediary template chip with negative-relief features having dimensions of a scale in the micron range. The intermediary template chip is used to case a production mold, which is formed of a reinforced epoxy resin that, once hardened into a solid epoxy member, can withstand the structural pressures of a CNC machining system. The production mold can be refined by a (Continued)

CNC machining, where the refined production mold is then used to cast production chips to be used as microfluidic chips.

20 Claims, 5 Drawing Sheets

(51) Int. Cl.
  *B29C 33/38* (2006.01)
  *B01L 3/00* (2006.01)
  *B29C 39/00* (2006.01)
  *B29C 39/02* (2006.01)
  *B29C 59/02* (2006.01)
  *B29K 33/00* (2006.01)

(52) U.S. Cl.
  CPC ............ *B29C 33/42* (2013.01); *B29C 39/003* (2013.01); *B29C 39/026* (2013.01); *B29C 59/02* (2013.01); *B01L 2300/0816* (2013.01); *B01L 2300/0887* (2013.01); *B01L 2300/12* (2013.01); *B29K 2033/12* (2013.01); *B29K 2863/00* (2013.01); *B29K 2883/00* (2013.01); *B29K 2907/00* (2013.01)

(58) Field of Classification Search
  CPC ......... B29C 65/70; B29C 59/02; B29C 33/42; B32B 27/38
  See application file for complete search history.

(56) References Cited

U.S. PATENT DOCUMENTS

| | | |
|---|---|---|
| 2004/0241049 A1 | 12/2004 | Carvalho |
| 2006/0257627 A1 | 11/2006 | Shim et al. |
| 2007/0134362 A1 | 6/2007 | Heidari |
| 2008/0055581 A1 | 3/2008 | Rogers et al. |
| 2008/0217822 A1 | 9/2008 | Chou et al. |
| 2009/0281250 A1* | 11/2009 | DeDimone ........... B29C 66/723 525/418 |
| 2010/0219401 A1 | 9/2010 | Bradley et al. |
| 2011/0236277 A1 | 9/2011 | Lee et al. |
| 2011/0306081 A1* | 12/2011 | Szita ................ B01L 3/502715 435/29 |
| 2012/0205838 A1* | 8/2012 | Washiya ................ B82Y 10/00 264/447 |
| 2013/0002753 A1* | 1/2013 | Wang .................... B41J 2/1603 347/20 |

OTHER PUBLICATIONS

Chow et. al, Microfuidic Channel fabrication by PDMS-interface bonding, Smart Mater. Struct 15, 2006, S112-S116 (Year: 2006).*
Young, et al., "Rapid Prototyping of Arrayed Microfluidic Systems in Polystyrene for Cell-Based Assays", *Analytical Chemistry*, pp. A-J, Dec. 29, 2010.
International Patent Application No. PCT/US2015/047393, International Search Report and Written Opinion, dated Nov. 27, 2015, 10 pages.
Extended European Search Report from EP 15835781.4, dated Jan. 9, 2018.

* cited by examiner

EPOXY MOLD MAKING AND MICROMILLING FOR MICROFLUIDICS

CROSS-REFERENCE TO RELATED APPLICATIONS

This application claims priority to and the benefit of U.S. Provisional Application No. 62/044,131, entitled "EPOXY MOLD MAKING AND MICROMILLING FOR MICROFLUIDICS," filed Aug. 29, 2014, the disclosure of which is hereby incorporated by reference.

FIELD OF THE INVENTION

The present invention generally relates to the field of microfluidics. More specifically, many embodiments and aspects are directed to a microfluidic chip and process for manufacturing a microfluidic chip that that can be used with several biochemical tests or assays, which can include tests or assays illumination or luminescence emitted directly or indirectly from a sample.

BACKGROUND OF THE INVENTION

Microfluidic chips are used for the handling, separation, control, measurement, and analysis of biological and/or chemical fluids, or biological and/or chemical samples suspended in fluid, particularly biomolecules samples that can be in the micron scale of size. The manufacture or fabrication of microfluidic chips, however, can be problematic in relation to the time, materials, expense, and precision required to make molds from which microfluidic chips are produced.

SUMMARY OF THE INVENTION

The following presents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

In aspects or embodiments, the present disclosure is directed to a method for forming microfluidic chips including the steps of forming a base mold, casting an intermediary template chip mold based on the base mold, casting a production mold based on the intermediary template chip mold, refining the production mold to generate a refined production mold, casting a production chip based on the production mold, and modifying the production chip with a hot embossing process. In some aspects, the base mold can be made of a silicon wafer and a photoresist material. In other aspects, forming the base mold can include rotating the silicon wafer as the photoresist material is deposited onto the silicon wafer, such that the photoresist material forms a film on the silicon wafer. In further aspects, forming the base mold can further include exposing the rotating silicon wafer and photoresist material to ultraviolet (UV) light. In such aspects, a rotating silicon wafer and photoresist material can be exposed to UV light incident at an angle from about 30° to about 35°, where the angle is measure from normal. In some aspects, forming the base mold can include forming positive-relief features on the base mold. In such aspects, forming the base mold can include forming positive-relief features on the base mold having draft angles of about 15°.

In some aspects or embodiments of forming microfluidic chips, an intermediary template chip mold can be made of poly(dimethylsiloxane) ("PDMS"). In further aspects, the intermediary template chip mold can have a plurality of microchannels, where the microchannels have dimensions of less than about one hundred microns (100 μm). In some aspects, the production mold can be formed from an aluminum-filled epoxy. In such aspects, the production mold can be refined in shape, where refining the production mold made of an aluminum-filled epoxy further includes micromilling positive-relief features on the production mold. In further aspects, micromilling positive-relief features of the production mold further includes altering the height of the positive-relief features to have a variable height. In such aspects, the micromilling of positive-relief features of the production mold can be controllable by a computer-numerical-control ("CNC") machining system.

In some aspects or embodiments of forming microfluidic chips, a production chip can be made of poly(methyl methacrylate) ("PMMA"). In such aspects, the production chip can have a plurality of microchannels, where the microchannels have dimensions of less than about one hundred microns (100 μm). In other aspects, the hot embossing process can include applying force on the production chip with a metal press. In such aspects, the metal press can be operated at a peak heat level of about 140° C. to about 180° C. Also in such aspects, the metal press can be operated at a peak pressure level of about 3000 lbf. In some aspects, hot embossing process can form one or more through-holes in the production chip. In further aspects, the hot embossing process can form one or more indentations in the production chip.

In further aspects or embodiments, the present disclosure is directed to a system or implementing a method for forming microfluidic chips according to the present disclosure.

BRIEF DESCRIPTION OF THE DRAWINGS

Illustrative aspects of the present disclosure are described in detail below with reference to the following drawing figures.

DETAILED DESCRIPTION OF THE INVENTION

Figure 1:
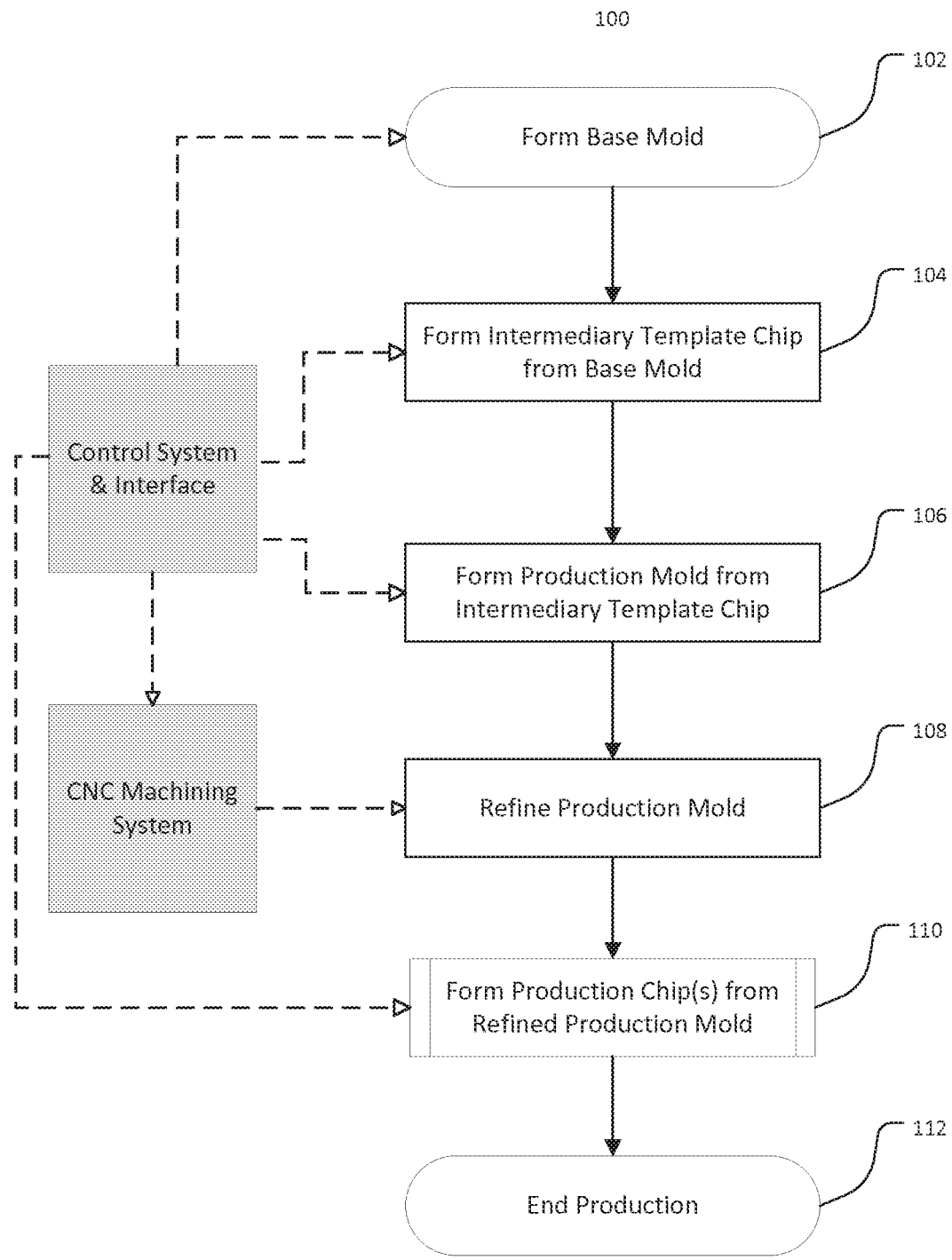
FIG. 1 is a flowchart representing elements of method for forming a microfluidic chip, according to some aspects or embodiments of the present disclosure.

Throughout this description for the purposes of explanation, numerous specific details are set forth in order to provide a thorough understanding of the many embodiments disclosed herein. It will be apparent, however, to one skilled in the art that the many embodiments may be practiced without some of these specific details. In other instances, well-known structures and devices are shown in diagram or schematic form to avoid obscuring the underlying principles of the described embodiments.

Microscale technologies can be compact, easy to use, and can have more functions and higher feature density than traditional microscale technologies. The small feature sizes of apparatus such as microfluidic chips can be on a similar physical scale to many biomolecules like cells and proteins, which makes such apparatus useful for biomedical applications in labs and clinics for analyzing biological materials. The biomedical device industry is highly interested in developing the next generation of microscale technologies, but advancing the technology from test prototype to commercial product is challenging because it requires the ability to make these devices out of low-cost, abundant, and manufacturable raw materials like plastics. While the manufacturing sector has many methods and processes for fabricating plastic parts in high volume, these methods are not well suited for microscale devices, especially those that contain microscale features less than one hundred micrometers (100 μm) in dimension, and require enclosed conduits that enable the flow and manipulation of fluids, as well as the substances suspended in these fluids.

One of the major challenges associated with the fabrication of microscale fluidic devices is the ability to perform hot embossing of three-dimensional (3D) microscale features using low-cost molds that can be rapidly prototyped during the initial and/or design phases of development. Hot embossing is an attractive 3D manufacturing method from an industrial perspective because hot embossing is relatively economical for medium volume production, where "medium volume production" is generally a scale of production greater than laboratory bench-top scale production, but also of a scale less than commercial production. In some aspects, medium volume production can refer to production volumes similar to that of pilot plant stage fabrication. Further, hot embossing methods can be made into a continuous stamping process to streamline workflow. However, 3D microscale features are challenging to manufacture with precision by hot embossing alone, particularly with the required surface smoothness needed for optically transparent plastic parts. Accordingly, in the field of mold fabrication, many molds are fabricated using rough milling procedures followed by an expensive and labor-intensive polishing step. Aspects of the present disclosure detail new methods of creating hot embossing molds with 3D microscale features that also preserve surface smoothness.

To address the issue of creating 3D structures without excessively complicating the fabrication process, aspects of the present disclosure involve a novel method applying a combination of hot embossing, epoxy mold formation, and numerical control milling or routing. In some aspects, the processes disclosed herein can be performed in academic laboratories at the "bench top" scale, while in other aspects the processes disclosed herein can be performed in mid-volume and/or scale-up pilot plant manufacturing scale, and in further aspects the processes disclosed herein can be performed in high-volume industrial and commercial applications.

In some aspects, a method of the present disclosure incorporates elements of a method of two-stage transfer from a photolithographic master mold made of silicon and SU-8 photoresist to a high compressive strength aluminum-filled epoxy mold, published as, "*Rapid Prototyping of Arrayed Microfluidic Systems in Polystyrene for Cell-Based Assays*" Edmond W. K. Young et al., *Anal. Chem.*, 2011, 83 (4), pp. 1408-1417, Jan. 24, 2011, which is incorporated by reference herein, Elements or steps of such processes that are incorporated by methods of the present disclosure include, but are not limited to, (1) the elimination of surface and internal cavities caused by bubble formation in an epoxy mold, (2) the control of uniform thickness of an epoxy mold, (3) the refining of positive-relief structures with micromilling or routing processes to create 3D features in epoxy-based molds, and (4) hot embossing 3D features in production quality microfluidic chips. In combination, these modified elements significantly improve and advance the method of hot embossing microscale features in polymers at low cost. In particular, the lower cost and efficiency of methods of the present disclosure can produce polymer-based molds, having sufficient surface uniformity and internal homogeneity of material, orders of magnitude less expensive than machined metal molds. Moreover, the processes as disclosed herein can be accomplished over the course of 2-3 days, whereas traditional master mold formation and batch production can take weeks, and further requires production in batch sizes that are often in excess of research and development needs. Such lead-time significantly hinders progress during the iterative design phase of microfluidic technology development.

As used herein, unless otherwise indicated, the terms "positive-relief", "raised features", "ridges", "protrusions", and the like refer to structures of a fabricated body, such as a mold or microfluidic chip, where structural characteristics extend outward from the core or central mass of the fabricated body, from the primary surface of the body. As further used herein, unless otherwise indicated, the terms "negative-relief", "inset features", "channels", "grooves", and the like refer to structures of a fabricated body where structural characteristics extend inward toward the core or central mass of the fabricated body, from the primary surface of the body.

FIG. 1 is a flowchart representing elements of method for forming a microfluidic chip 100. At step 102 a base mold, alternatively referred to as a master mold, is formed. At step 104, an intermediate template chip is formed, where the shape of the intermediate template chip is based on the base mold. At step 106, a production mold is formed, where the shape of the production mold is based on the intermediate template chip. At step 108, the production mold is refined, which is a modification of the structure and shape of the production mold. At step 110, a production chip is formed, where the shape of the production chip is based on the refined production mold. At step 112, the production of microfluidic chips is ended.

In some aspects, the fabrication of the base mold at step 102 can include in part elements of a soft lithography process. In particular aspects, the base mold can be formed by a combination of a silicon material and a photoresist material. In some aspects, the photoresist material can be an SU-8 (or other) negative photoresist, or a MICROPOSIT (or other) positive photoresist. In fabricating a base mold, the photoresist material can be spin-coated onto a silicon wafer to generate a desired thickness of photoresist film on the silicon wafer, Once applied to have a desired thickness, the photoresist film on the silicon chip can be exposed to heating conditions one or more times at one or more temperatures to bake or cure the photoresist. The photoresist can be further exposed to ultraviolet (UV) light during any one or combination of before, after, and in between heating conditions, causing activation of the photoresist that then enables cross-linking of photoresist polymeric chains in a subsequent post-exposure baking ("PEB").

The base mold can have positive-relief features formed during fabrication of the base mold 102. Where the height of positive-relief features, or the change in height of positive-relief features, on the base mold is about fifty micrometers or greater (≥50 μm), a sufficient draft angle on those features can be useful to ensure that a cast of the base mold can be efficiently removed or separated from the base mold. The silicon wafer can be rotated during UV exposure of the photoresist layers on the silicon, thereby forming angled side walls and other features, and in particular draft angle features. In some aspects, UV light can be directed toward, or incident on, photoresist material on a silicon wafer at an angle of about 0° to about 60° from normal. In other aspects, UV light can be directed toward photoresist material on a silicon wafer at an angle of about 10° to about 50°, an angle of about 20° to about 40°, an angle of about 30°, an angle of about 45°, or an angle of about 30° to about 35°, all measured from normal, inclusive of any increment or gradient within such ranges. The angle of exposure to UV light should be sufficient to generate enough radiation throughout the photoresist material to fully activate the photoresist, including at the bottom of the photoresist feature adjacent to a substrate such as a silicon wafer. Once features are formed in the photoresist material, the base mold can be developed in a solution of propylene glycol monomethyl ether acetate that removes non-cross-linked photoresist material, thereby revealing positive-relief features.

In some aspects, the fabrication of the intermediary template chip at step 104 can include further elements of a soft lithography process. In particular, the intermediary template chip can be formed with PDMS poured to cover the positive-relief features of the base mold. In other aspects, the intermediary template chip can be formed with an acrylic, PMMA, polycarbonate, polystyrene, cyclo-olefin polymer ("COP"), or other polymer material. Accordingly, the intermediate template chip can have negative-relief features that mirror positive-relief features of the base mold. In other words, the intermediate template chip is the negative mold of the base mold, or is cast from the base mold.

The intermediate template chip can have an array, plurality, and/or network of microchannels, mirroring the raised features of the base mold. The microchannels in the intermediate template chip can be less than one hundred micrometers (<100 μm) in any dimension, e.g. in width/length or depth, in the intermediate template chip. In some aspects, the microchannels can have dimensions less than fifty micrometers (<50 μm), less than two hundred micrometers (<200 μm), less than three hundred micrometers (<300 μm), or anywhere from about fifty micrometers to about three hundred micrometers (50-300 μm), inclusive of any increment or gradient within such ranges. In other aspects, the microchannels can have a lateral (i.e. width or length) of one thousand micrometers (1000 μm) or greater. In further aspects, the microchannels can have a depth of up to five hundred micrometers (500 μm). Other limitations on the dimensions can result from the size of the silicon substrate available and the area of UV exposure that can be achieved in an exposure-alignment system.

In some aspects, the fabrication of the production mold at step 106 can include pouring an epoxy resin over an intermediary template chip to cover the negative-relief features of the intermediary template chip. The epoxy resin, once hardened by a curing process, is an epoxy production mold. The production mold can have positive-relief features that mirror negative-relief features of the intermediary template chip. In other words, the production mold is the negative mold of the intermediate template chip, or is cast from the intermediate template chip.

In other aspects, the epoxy resin used for step 106 to form a production mold can be an aluminum-filled epoxy resin. The epoxy resin used for step 106 can alternatively be filled or reinforced with other elements, metals, ceramics, or particulates, including but not limited to silver, boron, gallium, or stainless steel. Examples of aluminum-filled epoxy products include, but are not limited to RenCast™ 4037 polyurethane elastomers (Freeman Manufacturing, Avon, Ohio), Adtech™ EC-415 (Adtech Plastic Systems, Madison Heights, Mich.), Weidling C™ (Weicon GmbH & Co. KG, Germany). Such materials are generally materials that can be initially poured in a liquid form, permanently cured by thermosetting, and have a high compression strength properties, where filling elements such as metals can fillers increase the compression strength. The epoxy resin used to form a production mold at step 106 is poured over an intermediary template chip, which is possible because the epoxy resin is in a viscoelastic state, or a non-Newtonian fluid state. The epoxy resin can be allowed to homopolymerize (i.e. polymerize with itself) over a period of time, copolymerized with a polyfunctional curative or hardener, or is cured at an elevated temperature, to harden to a solid state and thereby form a solid epoxy production mold. In some aspects, the epoxy resin can be cured, and further heat-treated for increased structural strength, by being heated at a temperature of about 60° C. to about 200° C., inclusive of any increment or gradient within such ranges. In other aspects, the epoxy resin can be copolymerized with a hardener, as known with two-component epoxy resins. In some aspects, the production mold can have an average thickness of from about three millimeters (3 mm) to about twenty millimeters (20 mm), with a variability of about one hundred microns (±100 μm). In particular aspects, the production mold can have an average thickness of about fifteen millimeters (15 mm), with a variability of about one hundred microns (±100 μm).

Formation of an epoxy-based production mold can include a variety of techniques to increase the structural strength and robustness of the production mold. In some aspects, preparation of the epoxy resin used to form a production mold can include heating the epoxy resin to lower the viscosity of the epoxy resin, such that the epoxy resin is in a viscoelastic state. By heating the epoxy resin, air or gas bubbles held within the epoxy can escape the viscoelastic material, thereby increasing the density of the epoxy resin and providing for a corresponding increase in strength of a production mold formed by the epoxy once cured or otherwise hardened. In such aspects, the setting of the epoxy can be at a temperature below the temperature that would cure the epoxy resin, or at a temperature that only slowly cures the epoxy resin.

In other aspects, preparation of the epoxy resin can include a centrifugation process to increase the structural strength, homogeneity, and robustness of the production mold. When centrifuged, air or gas bubbles in an epoxy resin can be driven by the apparent centrifugal force to separate from the denser epoxy resin. The air or gas may not completely escape the epoxy resin, thereby forming a foam-like region of epoxy resin in the container in which the epoxy resin is centrifuged. Accordingly, a container used to hold the epoxy resin as it is centrifuged can be configured to have a re-sealable opening, where the container is oriented within a centrifuge such that an end of the container having the re-sealable opening points toward the interior of the centrifuge. In other words, when centrifuged, the relatively dense epoxy resin will migrate toward the end of the container having the re-sealable opening (down and away from the axis of rotation), and any air or gas bubbles or generated foam will migrate away from the an end of the container having the re-sealable opening (up and inward toward the axis of rotation). During fabrication of the production mold at step 106, any foam generated during the centrifugation process can be decanted, removed, or avoided such that no foam is poured onto an intermediary template chip.

In further aspects, both a heating and centrifugation process can be applied to prepare the epoxy resin. In such aspects the epoxy resin can be prepared by a heating process first and with a subsequent centrifugation process. In other aspects the epoxy resin can be prepared by a centrifugation process first and then with a subsequent heating process. In further aspects, the heating process and centrifugation process can be concurrent. When the production mold is processed to increase its structural strength and robustness, the production mold can have a greater tolerance to withstand machining processes without cracking, breaking, deforming, or otherwise experiencing structural failure.

In some aspects, the refining of the production mold at step 108 can include a computer-numerical-control machining process, particularly the micromilling of an epoxy-based production mold, Traditionally, CNC machining is utilized to cut or modify metal molds, such as molds made of aluminum or steel, which are generally structurally stronger than polymer-based molds. It was unexpected to successfully cut and modify a polymer mold, even one made of an aluminum-filled epoxy, when subjected to the pressures of a CNC machining process, where the polymer mold was sufficiently robust to not break or permanently deform. The traditionally understood fragility and likely breakage of relatively thin polymer structures subjected to the mechanical stress of micromilling or CNC machining would otherwise dissuade the combination of CNC machining with epoxy-based molds, as discussed herein. A CNC machining device can have a user interface or other such control mechanism to set or guide micromilling of the production mold.

A production mold made of an aluminum-filled epoxy can be sufficiently robust to not break or permanently deform when subjected to the pressures of a CNC machining process. The micromilling process of step 108 can alter the height and/or shape of the positive-relief features of the production mold, refining the structure and characteristics of the production mold. In some aspects, the positive-relief features of the production mold can be shaped to have variable heights. Similar to the fabrication of the base mold in step 102, where the height of positive-relief features, or the change in height of positive-relief features, on the production mold is about fifty micrometers or greater (≥50 µm), a sufficient draft angle on those features can be useful to ensure that a east of the production mold can be efficiently removed or separated from the production mold. The CNC machining process can form a draft angle on the positive-relief features of the production mold at various angles. In some aspects, the positive-relief features of the production mold can have a draft angle of about 5° to about 85°, an angle of about 15° to about 75°, an angle of about 30° to about 60°, an angle of about 45°, or an angle of about 30° to about 35°, all measured from normal, inclusive of any increment or gradient within such ranges.

In some aspects, the formation of production chips at step 110 can include pouring a PMMA over a production mold to cover the positive-relief features of the production mold. In many aspects, the production mold is a refined production mold. In other words, the production chip is the negative mold of the (refined) production mold, or is cast from the (refined) production mold. In other aspects, the production chip can be formed with an acrylic, PMMA, polycarbonate, polystyrene, COP, or other polymer material. In many aspects, the material used to form the production chip at step 110 is at least partially optically transparent to visible light, and can be further at least partially transparent to infrared or ultraviolet light. The production chip can have an array, plurality, and/or network of microchannels, mirroring the raised features of the production mold. The microchannels in the production chip can be less than one hundred micrometers (<100 µm) in any dimension, e.g. in width or depth, in the production chip. In some aspects, the microchannels can have dimensions less than fifty micrometers (<50 µm), less than two hundred micrometers (<200 µm), less than three hundred micrometers (<300 µm), or anywhere from about fifty micrometers to about three hundred micrometers (50-300 µm), inclusive of any increment or gradient within such ranges. In other aspects, the microchannels can have a lateral (i.e. width or length) of one thousand micrometers (1000 µm) or greater. In further aspects, the microchannels can have a depth of up to five hundred micrometers (500 µm).

Formation of production chips at step 110 can further include hot embossing the production chips. In some aspects, the hot embossing process can refine or finalize the production chip for use as a microfluidic chip. In particular, hot embossing of production chips can impart further 3D microscale features onto the production chips. Hot embossing of the production chips can further modify the negative-relief features of the production chip, such as the side walls or bottom surfaces of microchannels. Similarly, hot embossing can modify the surfaces of a production chip, creating features such as indentations, channels, or through-holes in the production chips. In further aspects, a production chip can be arranged between two hot embossing mold, which can thereby form features on both sides of the production chip. In many aspects, the production chip can withstand the temperatures and pressures involved with a hot embossing process. In such aspects, the hot embossing process can operate at temperatures from about 75° C. to about 180° C., from about 95° C. to about 100° C., or from about 125° C. to about 135° C., inclusive of any increment or gradient within such ranges. In various aspects, one or more through-holes can be formed in the production chip by hot embossing. In further aspects, one or more indentations can be formed in the production chip by hot embossing.

In some aspects, the manufacturing of production chips can end at step 112. The production chips can be postprocessed, such as by milling out the production chip from a stock plastic sheet to form an outside edge with defined shape. Alternatively, the defined shape can be simply defined directly by hot embossing, with positive-relief edge structures built directly into the production mold.

In further aspects, the formation of positive-relief features or negative relief-features on chips or molds disclosed herein can be accomplished by techniques including, but not limited to, laser etching, iron etching, 3D printing deposition, or sputter deposition. In particular, such techniques can be applied for refining the production mold at step 108.

Figure 2A:
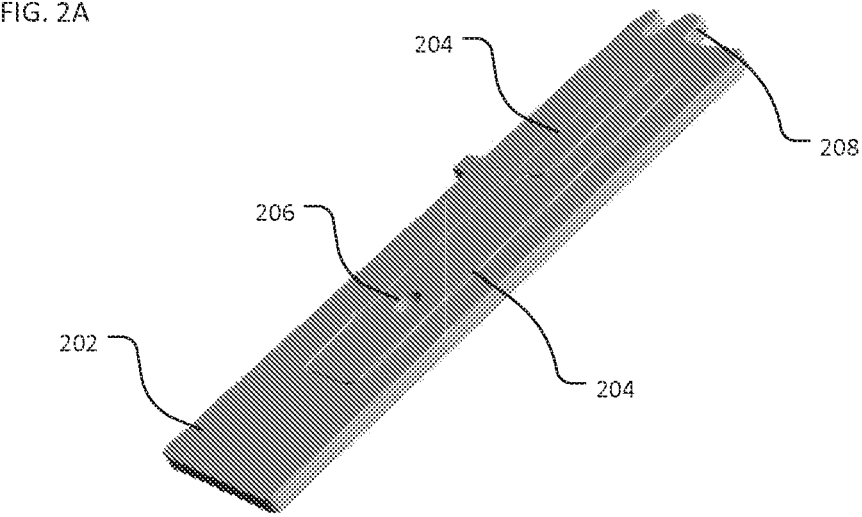
FIG. 2A is a perspective view illustration representing a microfluidic chip, according to some aspects or embodiments of the present disclosure.

FIG. 2A is a perspective view illustration representing a microfluidic chip 200. The microfluidic chip 200 has a primary surface 202 in which microchannels 204 have been molded. Further, the microfluidic chip 200 has at least a primary through-hole 206 that can be formed via hot embossing, where the primary though-hole 206 extends through the entire body of the microfluidic chip 200. In some aspects, the microfluidic chip 200 can have lateral projections 208, generally in the same plane as the main body of the microfluidic chip 200, which can provide for handling points, alignment, or positioning guides for the microfluidic chip 200. In some aspects, a microfluidic chip can have more than one primary through-hole 206, and in further aspects, can have an array or network of microchannels 204.

Figure 2B:
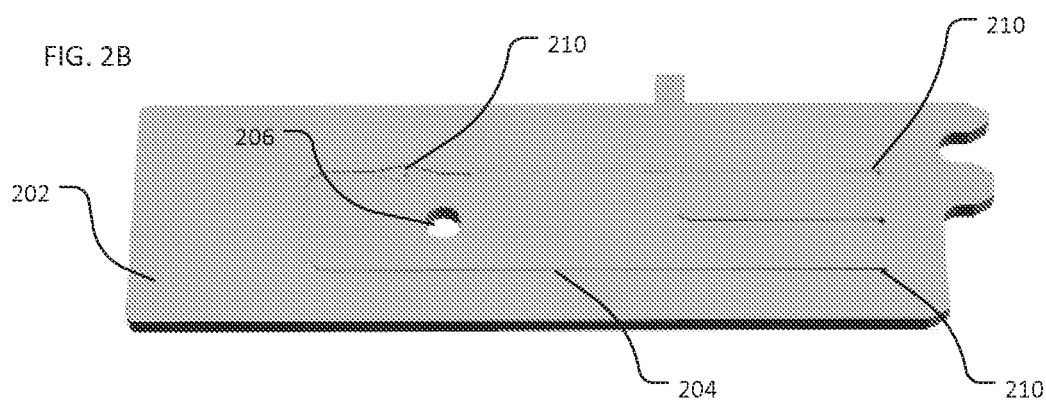
FIG. 2B is an angled top view illustration representing a microfluidic chip as shown in FIG. 2A, according to some aspects or embodiments of the present disclosure.

FIG. 2B is an angled top view illustration representing a microfluidic chip 200 as shown in FIG. 2A. Further illustrated are secondary through-holes 210 which can be located in the branching microchannels 204 of the microfluidic chip 200, and/or in the primary surface 202 of the microfluidic chip 202. The secondary through-holes 210 can also be formed via hot embossing, and can be generally smaller in diameter than the primary through-hole 206.

Figure 2C:
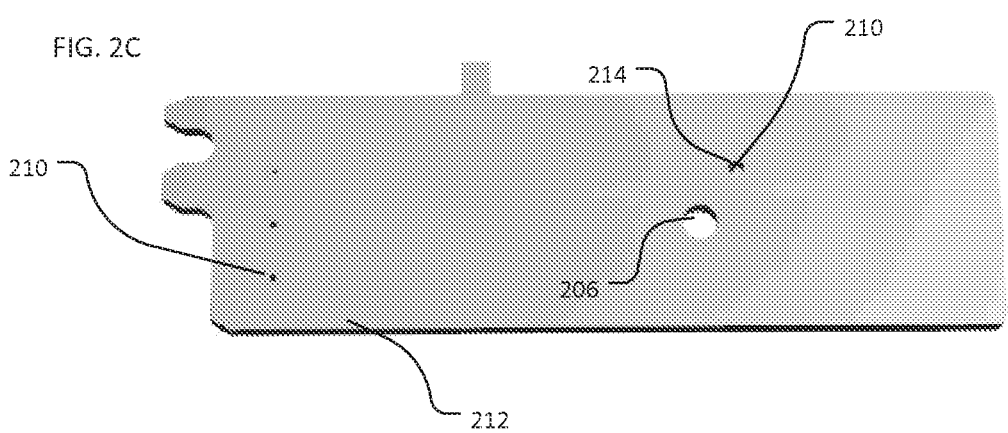
FIG. 2C is an angled bottom view illustration representing a microfluidic chip as shown in FIG. 2A, according to some aspects or embodiments of the present disclosure.

FIG. 2C is an angled bottom view illustration representing a microfluidic chip 200 as shown in FIG. 2A. The rear surface 212 of the microfluidic chip reflects the fact that both primary through-holes 206 and secondary through-holes 210 pass through the entire body of the microfluidic chip. In some aspects, indentations 214, generally formed by hot embossing, can extend partially into, but not all the way through, the body of the microfluidic chip 200. Indentations 214 in the microfluidic chip 200, particularly indentations 214 in the rear surface 212, can provide for alignment points for the microfluidic chip 200 when placed in a system. In further aspects, either or both of primary through-holes 206 and secondary through-holes 210 can be located concentric with such indentations 214.

Figure 3A:
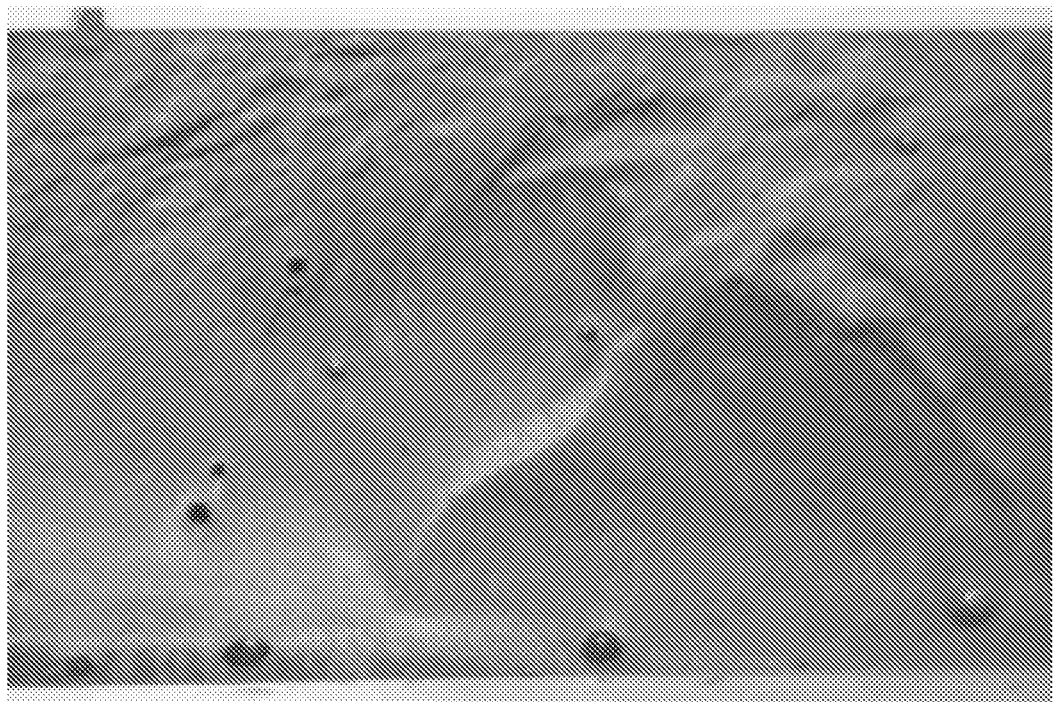
FIG. 3A is a cross-section image of an epoxy formed by method according to some aspects or embodiments, though without a centrifugation process, of the present disclosure.

FIG. 3A is a cross-section image of an aluminum-filled epoxy formed as described by a method of the present disclosure. The image represents a typical aluminum-filled epoxy mold that has been cross-sectioned to reveal an internal surface of the bulk epoxy material after curing. The dark circular objects represent bubbles that exist in the bulk when a centrifugation process is not applied to the epoxy resin. These bubbles increase the porosity of the bulk and can lower the compressive strength of the mold.

Figure 3B:
FIG. 3B is a cross-section image of an epoxy formed by a method according to some aspects or embodiments, including a centrifugation process, of the present disclosure.

FIG. 3B is a cross-section image of an aluminum-filled epoxy formed as described by a method of the present disclosure. In particular, the aluminum-filled epoxy shown in FIG. 3B has been formed from an epoxy resin subjected to both a heating process and to a centrifugation process. In contrast to FIG. 3A, the aluminum-filled epoxy shown in FIG. 3B lacks air or gas bubbles trapped in the epoxy that may reduce the physical strength of the aluminum-filled epoxy shown, and further shows a more uniform density than the aluminum-filled epoxy shown in FIG. 3A.

Figure 4A:
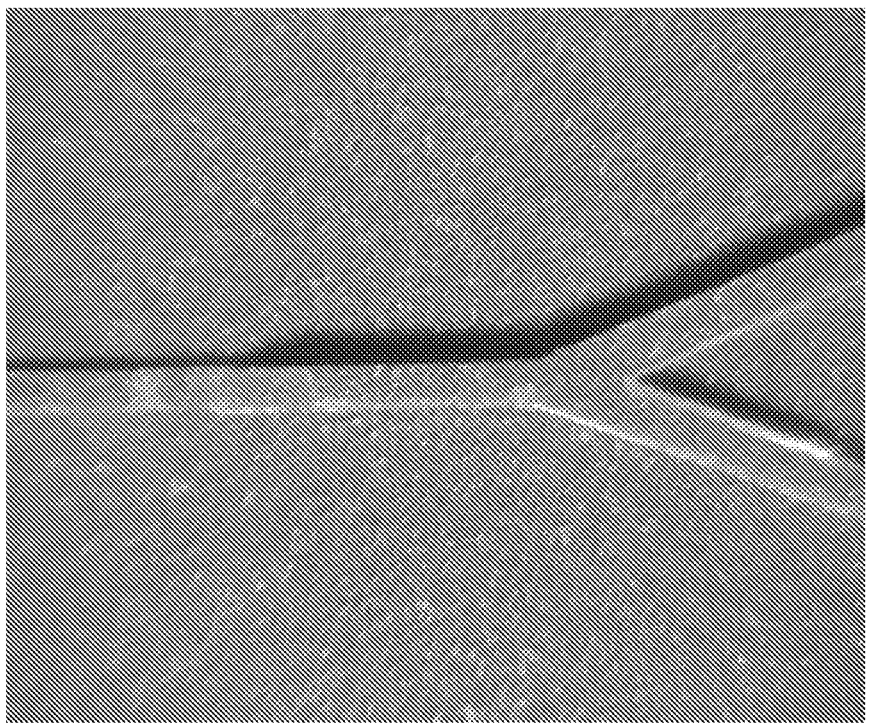
FIG. 4A is a top view image of a positive-relief region in epoxy before refinement under a method according to some aspects or embodiments of the present disclosure.

FIG. 4A is a top view image of a positive-relief region in epoxy before refinement under a method of the present disclosure. In particular, the positive-relief feature shown is a region of an aluminum-filled epoxy, a production mold fabricated as discussed in relation to step 106 of FIG. 1. The positive-relief features as shown in FIG. 4A are based on the negative relief features of an intermediate template chip.

Figure 4B:
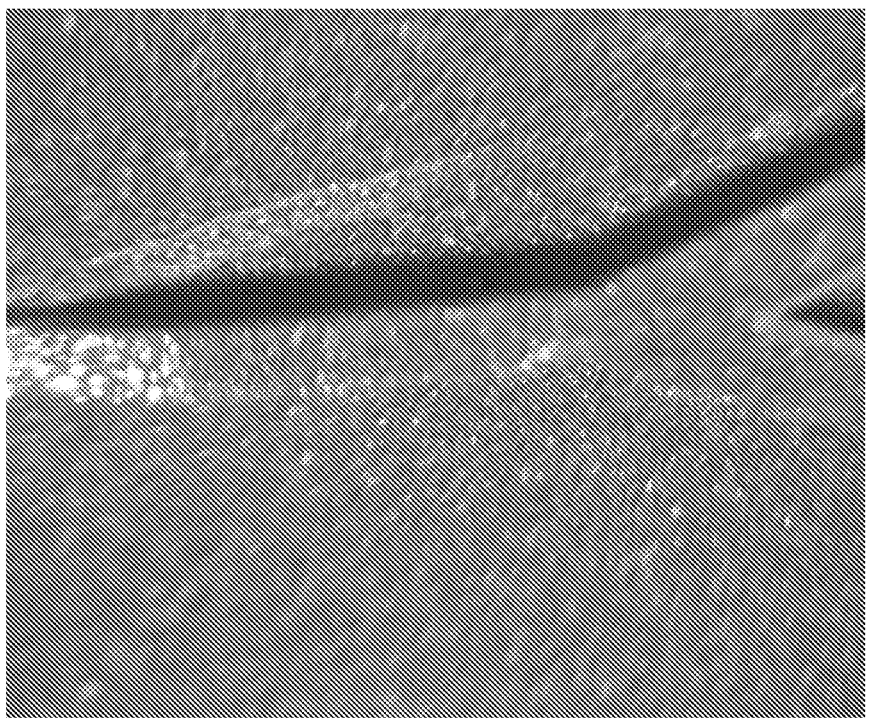
FIG. 4B is a top view image of a positive-relief region in epoxy after refinement under a method according to some aspects or embodiments of the present disclosure.

FIG. 4B is a top view image of a positive-relief region in epoxy after refinement under a method of the present disclosure. In particular, FIG. 4B shows the positive-relief structure from FIG. 4A after a micromilling process with a CNC machining apparatus or system. The positive-relief structure seen in FIG. 4B has a variable height, which when used as a production mold, can provide for production chips having a channel with a variable depth. In some aspects, the rotation speed of a micromilling CNC machining apparatus can control the smoothness of the change in height of the positive-relief structure.

Figure 5:
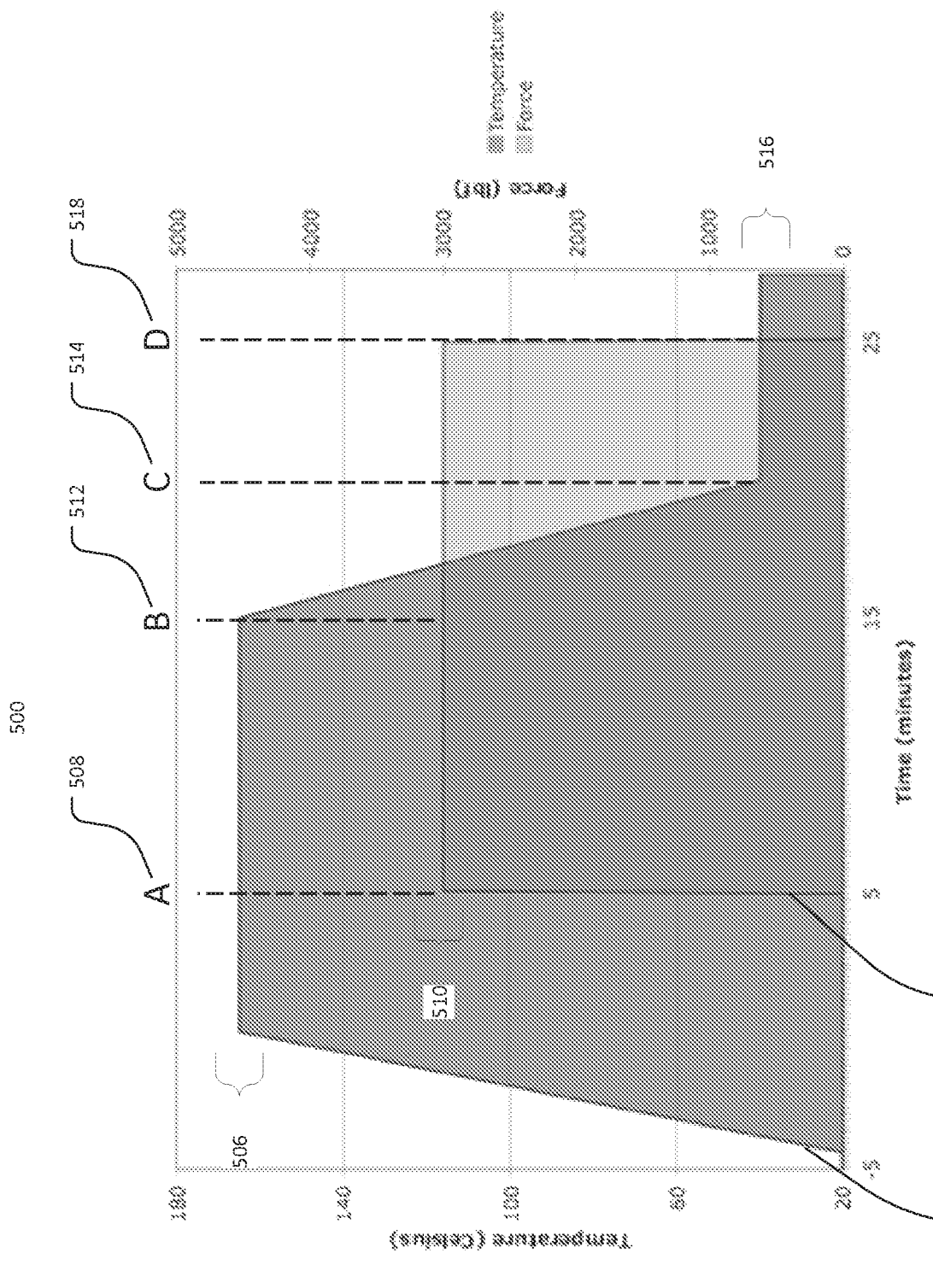
FIG. 5 is a graph representing temperatures and duration of processing for hot embossing of a microfluidic chip, according to some aspects or embodiments of the present disclosure.

FIG. 5 is a graph 500 representing temperatures and duration of processing for hot embossing of a microfluidic chip. The hot embossing process includes a metal press, where the metal press can be thermally controlled to raise or lower its temperature, where the metal press is configured to exert force onto a polymer-based material to emboss the material. In the context of the present disclosure, the polymer-based material can be a production chip. As shown in FIG. 5, a metal press can have a temperature profile 502 and a compressive force profile 504, under operating conditions to emboss a production chip. The metal press can controllably have its temperature profile 502 raised to a peak heat level 506. In some aspects, when in operation, the metal press peak heat level 506 can be from about 140° C. to about 180° C. At a time reference A 508, the metal press can have its pressure profile 504 as applied to the production chip increased to a peak pressure level 510; in other words, the press will begin to apply force to the production chip. In some aspects, the metal press peak pressure level 510 can be from about three thousand pounds of force (3000 lbf). At the peak pressure level 510, the metal press is exerting force on a production chip. The combination of heat and pressure on the production chip can emboss the production chip, which in some aspects can form through-holes in the production chip. At a time reference B 512, the temperature profile 502 of the metal press can begin to controllably decrease, such that at a time reference C 514, the metal press has a temperature profile 502 at a secondary heat level 516. At a time reference D 518, the metal press can have its pressure profile 504 as applied to the production chip decreased to zero; in other words, the press will stop applying force to the production chip.

In various aspects, the drop in temperature profile 502 from time reference B 512, to time reference C 514 can be linear or sigmoidal, and can be gradual or sharp. In other aspects, the drop in pressure profile 504 starting at time reference D 518 can be sharp or gradual, and can have a linear or non-linear profile.

In aspects, a process production chip, following a hot embossing procedure to form or modify 3D microfeatures, can be bonded with a solvent to a substrate or carrier device for application in a microfluidic device.

As provided herein, a microfluidic chip produced by the processes described herein can be utilized or coupled with a CNC machining system. Such a CNC machining system can include a user instrumentation interface, and can be electrically coupled to a microprocessor (or other such non-transitory computer readable mediums) by wires or by wireless means, and thereby send control or sensory data signals to the microprocessor. The coupled microprocessor can collect sensory data from the CNC machining system, and can further relay collected information to other non-transitory computer readable mediums, and/or run calculations on collected data and relay the calculated result to a user-operable and/or user-readable display. The sensory data captured by the CNC machining system, which in some aspects can include imaging or optical information, can be evaluated according to computer program instructions controlling the microprocessor (either through hardware or software) to analyze or base calculations on specific wavelengths of light emitted and/or reflected by elements of a microfluidic chip, or by fluids held or running through elements of a microfluidic chip.

As reflected in FIG. 1, the CNC machining system (or any other micromilling system) can be operable to refine the production mold. As further reflected in in FIG. 1, the control system and interface, which can include a user instrumentation interface, can be configured to control the CNC machining system and/or any other step of the process for terming a microfluidic chip according to the present disclosure.

The CNC machining system which can include a microprocessor can further be a component of a processing device that controls operation of the micromilling instrumentation. The processing device can be communicatively coupled to a non-volatile memory device via a bus. The non-volatile memory device may include any type of memory device that retains stored information when powered off. Non-limiting examples of the memory device include electrically erasable programmable read-only memory ("ROM"), flash memory, or any other type of non-volatile memory. In some aspects, at least some of the memory device can include a non-transitory medium or memory device from which the processing device can read instructions. A non-transitory computer-readable medium can include electronic, optical, magnetic, or other storage devices capable of providing the processing device with computer-readable instructions or other program code. Non-limiting examples of a non-transitory computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C #, Java®, Python®, Perl®, JavaScript®, etc.

The above description is illustrative and is not restrictive, and as it will become apparent to those skilled in the art upon review of the disclosure, that the present invention may be embodied in other specific forms without departing from the essential characteristics thereof. For example, any of the aspects described above may be combined into one or several different configurations, each having a subset of aspects. Further, throughout the foregoing description, for the purposes of explanation, numerous specific details were set forth in order to provide a thorough understanding of the invention. It will be apparent, however, to persons skilled in the art that these embodiments may be practiced without some of these specific details. These other embodiments are intended to be included within the spirit and scope of the present invention. Accordingly, the scope of the invention should, therefore, be determined not with reference to the above description, but instead should be determined with reference to the following and pending claims along with their full scope of legal equivalents.

What is claimed is:

1. A method for forming microfluidic chips comprising:
   forming a base mold;
   casting an intermediary template chip mold based on the base mold;
   casting a production mold based on the intermediary template chip mold, wherein the production mold comprises epoxy;
   refining the production mold to generate a refined production mold, wherein refining the production mold comprises changing the shape of the production mold;
   casting a production chip based on the refined production mold; and
   modifying the production chip with a hot embossing process.

2. The method according to claim 1, wherein the base mold comprises a silicon wafer and a photoresist material.

3. The method according to claim 2, wherein forming the base mold further comprises rotating the silicon wafer as the photoresist material is deposited onto the silicon wafer, such that the photoresist material forms a film on the silicon wafer.

4. The method according to claim 3, wherein forming the base mold further comprises exposing the rotating silicon wafer and the photoresist material to UV light.

5. The method according to claim 4, wherein the rotating silicon wafer and the photoresist material are exposed to UV light incident at an angle from about 30° to about 35° from normal.

6. The method according to claim 1, wherein forming the base mold further comprises forming positive-relief features on the base mold.

7. The method according to claim 6, wherein forming the base mold further comprises forming positive-relief features on the base mold having draft angles of about 15°.

8. The method according to claim 1, wherein the intermediary template chip mold comprises PDMS.

9. The method according to claim 1, wherein the intermediary template chip mold has a plurality of microchannels, where the plurality of microchannels have dimensions of less than about one hundred microns (100 μm).

10. The method according to claim 1, wherein the production mold comprises an aluminum-filled epoxy.

11. The method according to claim 10, wherein refining the production mold comprised of aluminum-filled epoxy further comprises micromilling positive-relief features of the production mold.

12. The method according to claim 11, wherein micromilling positive-relief features of the production mold further comprises altering a height of the positive-relief features to have a variable height.

13. The method according to claim 11, wherein the micromilling of positive-relief features of the production mold is controllable by a CNC machining system.

14. The method according to claim 1, wherein the production chip is comprises PMMA.

15. The method according to claim 1, wherein the production chip has a plurality of microchannels, where the plurality of microchannels have dimensions of less than about one hundred microns (100 μm).

16. The method according to claim 1, wherein the hot embossing process comprises applying force on the production chip with a metal press.

17. The method according to claim 16, wherein the metal press is operated at a peak heat level of about 140° C. to about 180° C.

18. The method according to claim 16, wherein the metal press is operated at a peak pressure level of about 3000 lbf.

19. The method according to claim 16, wherein the hot embossing process forms one or more through-holes in the production chip.

20. The method according to claim 16, wherein the hot embossing process forms one or more indentations in the production chip.

* * * * *